United States Patent [19]

Vaxelaire

[11] Patent Number: 5,364,153
[45] Date of Patent: Nov. 15, 1994

[54] SUN VISOR FOR VEHICLES WITH MIRROR AND ARTICLE STORAGE

[75] Inventor: Francis Vaxelaire, Lure, France

[73] Assignee: Gebr. Happich GmbH, Germany

[21] Appl. No.: 230,082

[22] Filed: Apr. 19, 1994

[30] Foreign Application Priority Data

Apr. 24, 1993 [DE] Germany .............................. 4313525

[51] Int. Cl.⁵ .............................................. B60R 7/08
[52] U.S. Cl. ........................................ 296/97.5; 296/37.1
[58] Field of Search .................... 296/97.5, 97.2, 97.1, 296/37.1, 37.7, 37.8

[56] References Cited

U.S. PATENT DOCUMENTS

| | | | |
|---|---|---|---|
| 2,547,101 | 4/1951 | Lutz | 296/97.5 X |
| 3,016,262 | 1/1962 | Hunt | 296/97.5 |
| 4,275,913 | 6/1981 | Marcus | 296/97.5 X |
| 4,275,916 | 6/1981 | Skogler . | |
| 4,807,093 | 2/1989 | Cisler | 296/97.5 X |
| 5,061,003 | 10/1991 | Gabas . | |

FOREIGN PATENT DOCUMENTS

| | | |
|---|---|---|
| 0317284 | 11/1988 | European Pat. Off. . |
| 0138387 | 6/1989 | European Pat. Off. . |
| 1895986 | 7/1964 | Germany . |
| 4023243 | 11/1991 | Germany . |

Primary Examiner—Joseph Pape
Attorney, Agent, or Firm—Ostrolenk, Faber, Gerb & Soffen

[57] ABSTRACT

A sun visor for a vehicle has a sun visor body which is provided with both a mirror and a storage compartment. The mirror is inserted into an opening in the sun visor body and is accessible to the user when the sun visor body is in its position of use. The storage compartment is inserted into an opening in the sun visor body and is accessible to the user when the sun visor body is in its position of non-use. The two openings are aligned with each other and pass through the visor body. The storage compartment pivots around a support frame on its side of the visor body. A hinged cover is positioned over the mirror on the other side of the visor body.

13 Claims, 4 Drawing Sheets

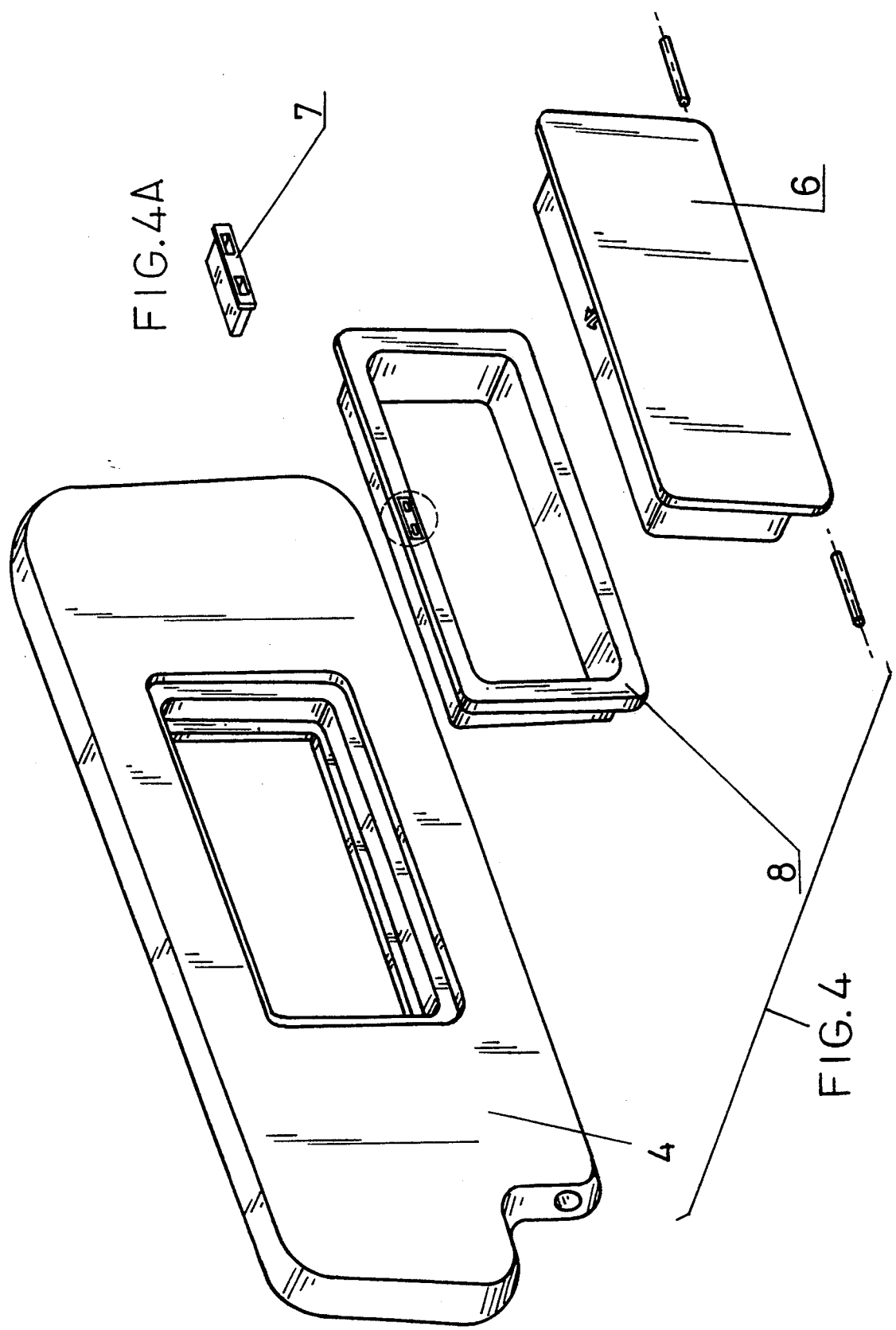

SUN VISOR FOR VEHICLES WITH MIRROR AND ARTICLE STORAGE

BACKGROUND OF THE INVENTION

The present invention relates to a sun visor for vehicles which has a sun visor body that is provided both with a make-up mirror and with a storage compartment.

A sun visor of this type disclosed in U.S. Pat. No. 4,275,916 has a sun visor body with an insertion unit fastened in a depression therein. The unit comprises a storage compartment, a mirror partially covering it, and a hinged cover for closing the compartment opening.

SUMMARY OF THE INVENTION

It is an object of the present invention to make a sun visor of this type more user friendly.

Another object is to not have a size limit on either one of the mirror or the compartment because of the surface area occupied by the other one.

The invention concerns a sun visor for a vehicle including a sun visor body which is provided on a first wide side with a first recess to receive a make-up mirror which is countersunk in the outer surface of the first side of the sun visor body and, on its other second wide side with a second recess intended to receive a storage compartment for smaller articles, e.g. papers, and the like. The recesses into the opposite surfaces of the visor are deep enough to be connected at their bottoms, forming one through recess. The storage compartment has a bottom and walls perpendicular to the bottom and is mounted for swinging along an edge on a frame seated in the recess.

The sun visor of the invention enables the make-up mirror and the storage compartment to be individually shaped and to be used independently of each other. The make-up mirror need not be reduced in size to make the storage compartment accessible. Rather, the sun visor body can be provided with a relatively large make-up mirror, which usually satisfies users.

It is or particular advantage that the make-up mirror be accessible without limitation when the sun visor body is in its downward swung, use position in front of the windshield. Furthermore, it is of particular advantage that the storage compartment be on that wide side of the sun visor body which is accessible to the user in the position of non-use of the sun visor body under the ceiling of the vehicle. The user need not bring the sun visor body down from its position of non-use into its position of use in order to be able to place or retrieve small articles in the storage compartment.

Simplified manufacture of the sun visor and the ease of mounting of the make-up mirror and of the storage compartment are achieved when the recesses are formed in the wide sides of the sun visor body by an opening which passes through the body. Although the make-up mirror and storage compartment are separated in space, they are nevertheless arranged directly alongside of each other so that the invention can be used even in relatively thin sun visor bodies.

A frame which holds the make-up mirror is preferably inserted into the opening of the sun visor body from the one side while a frame which supports the storage compartment is inserted from the other side. The frames are adapted to be fastened to each other by connecting elements.

Furthermore, the storage compartment can, to particular advantage, be held in its closed position of non-use by a locking mechanism and can be opened via an unlocking button, e.g. a push button.

Furthermore, a hinged cover for covering the make-up mirror when it is not in use can also be mounted on the mirror frame.

Other features and advantages of the present invention will become apparent from the following description of the invention which refers to the accompanying drawings.

BRIEF DESCRIPTION OF THE DRAWINGS

One embodiment of the invention is explained below with reference to the drawings, in which:

FIG. 4 is an exploded perspective view showing the sun visor body with its storage compartment installation group before mounting.

DETAILED DESCRIPTION OF THE INVENTION

Figure 1:
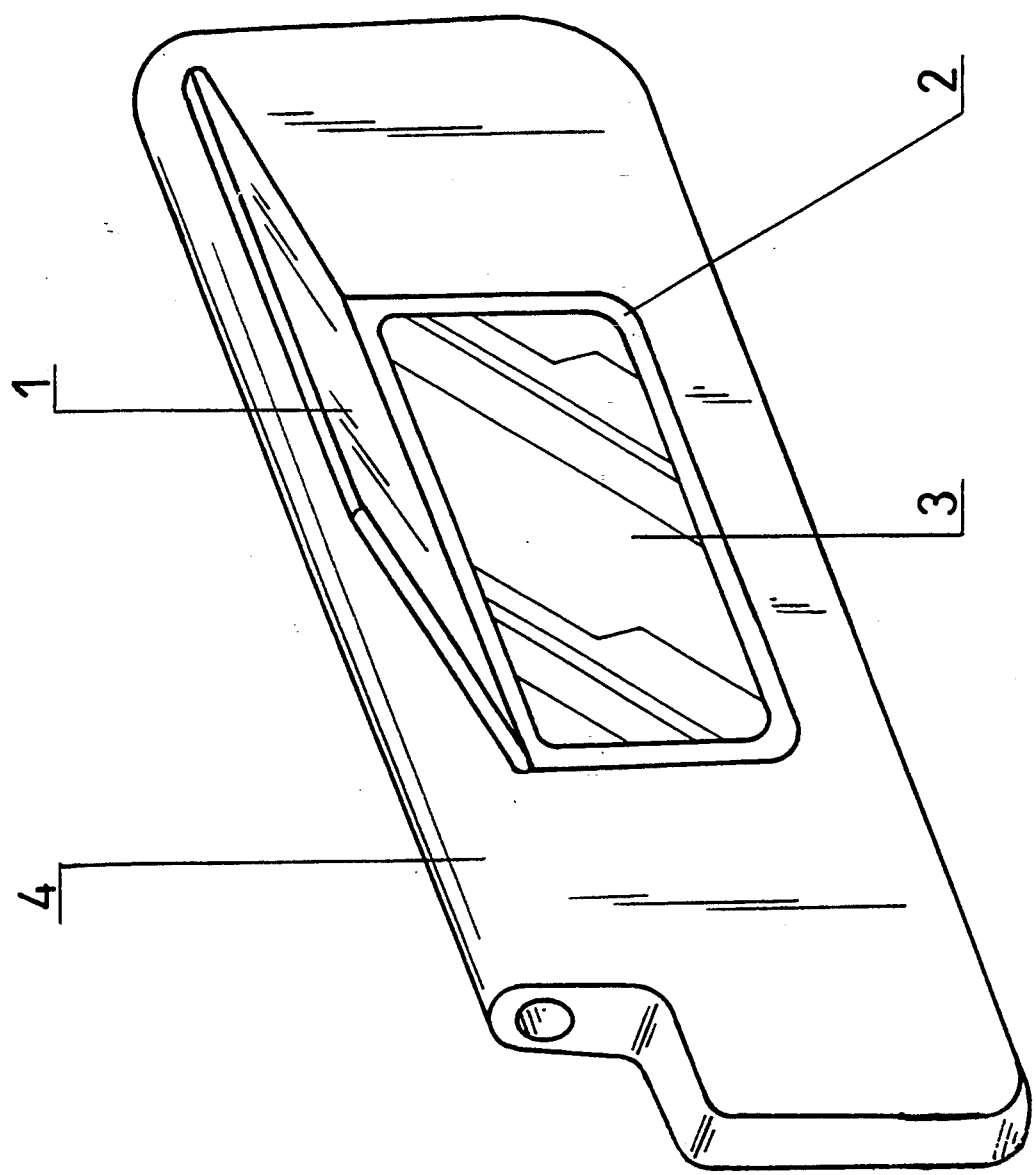
FIG. 1 is a perspective view showing a vehicle sun visor in its position of use.

FIG. 1 shows a sun visor body without the usual sun visor shaft, bearing bracket, outer support, and outer support bracket which are typically present. The visor is seen in its approximately vertically directed position of use in front of a windshield (not shown). In the position of use of the sun visor body 4, a make-up mirror 3 supported by a frame 2 can be viewed after the user opens a hinged cover 1.

Figure 2:
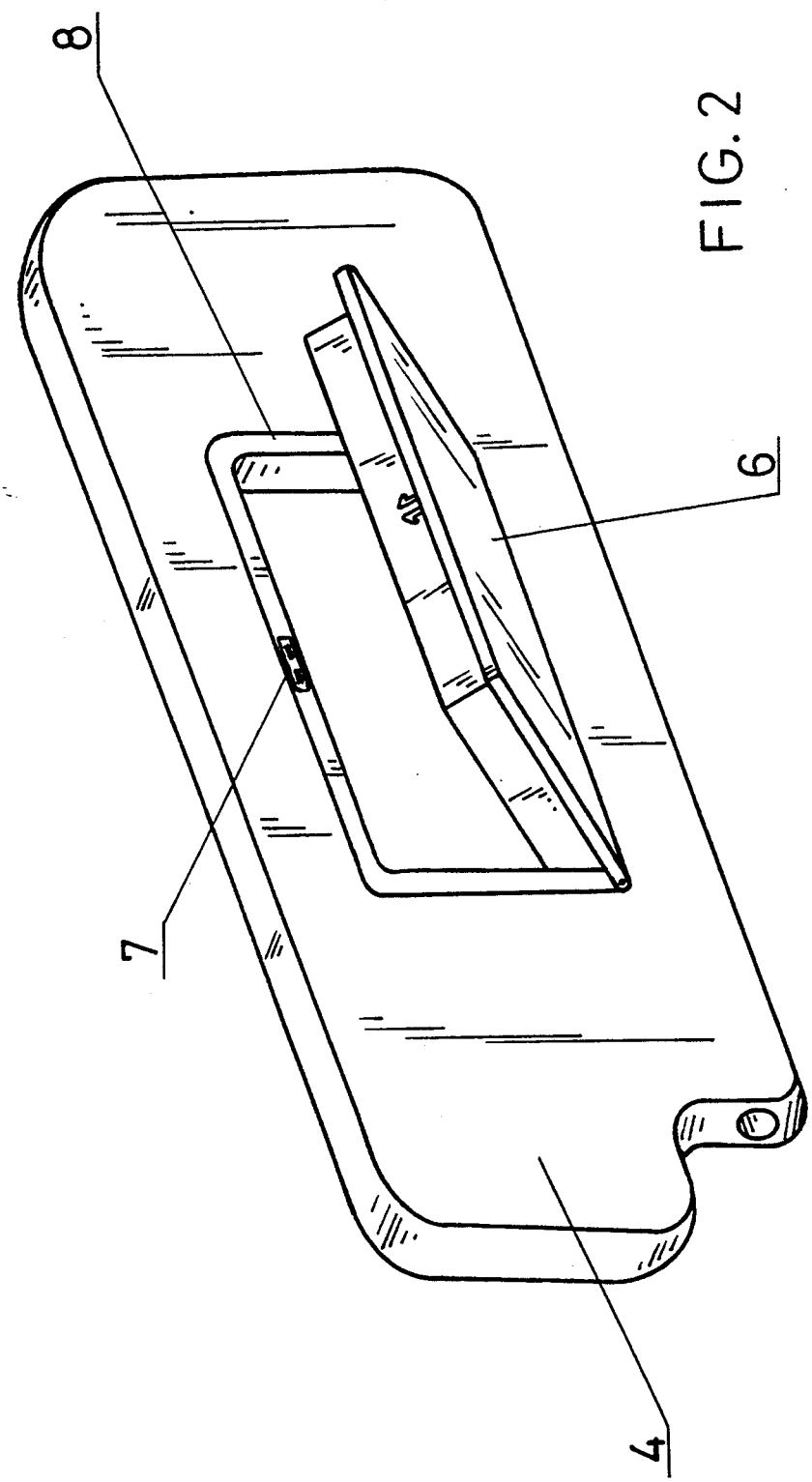
FIG. 2 shows the sun visor in its position of non-use.

The sun visor body 4 of FIG. 1 is shown in FIG. 2, in its position of non-use, in which it rests approximately horizontally against a vertical roof (not shown). In this position, a storage compartment 6 can be opened and made accessible after releasing a locking push button releasable locking mechanism 7. The storage compartment is mounted for swinging along one edge on a frame 8.

Figure 3:
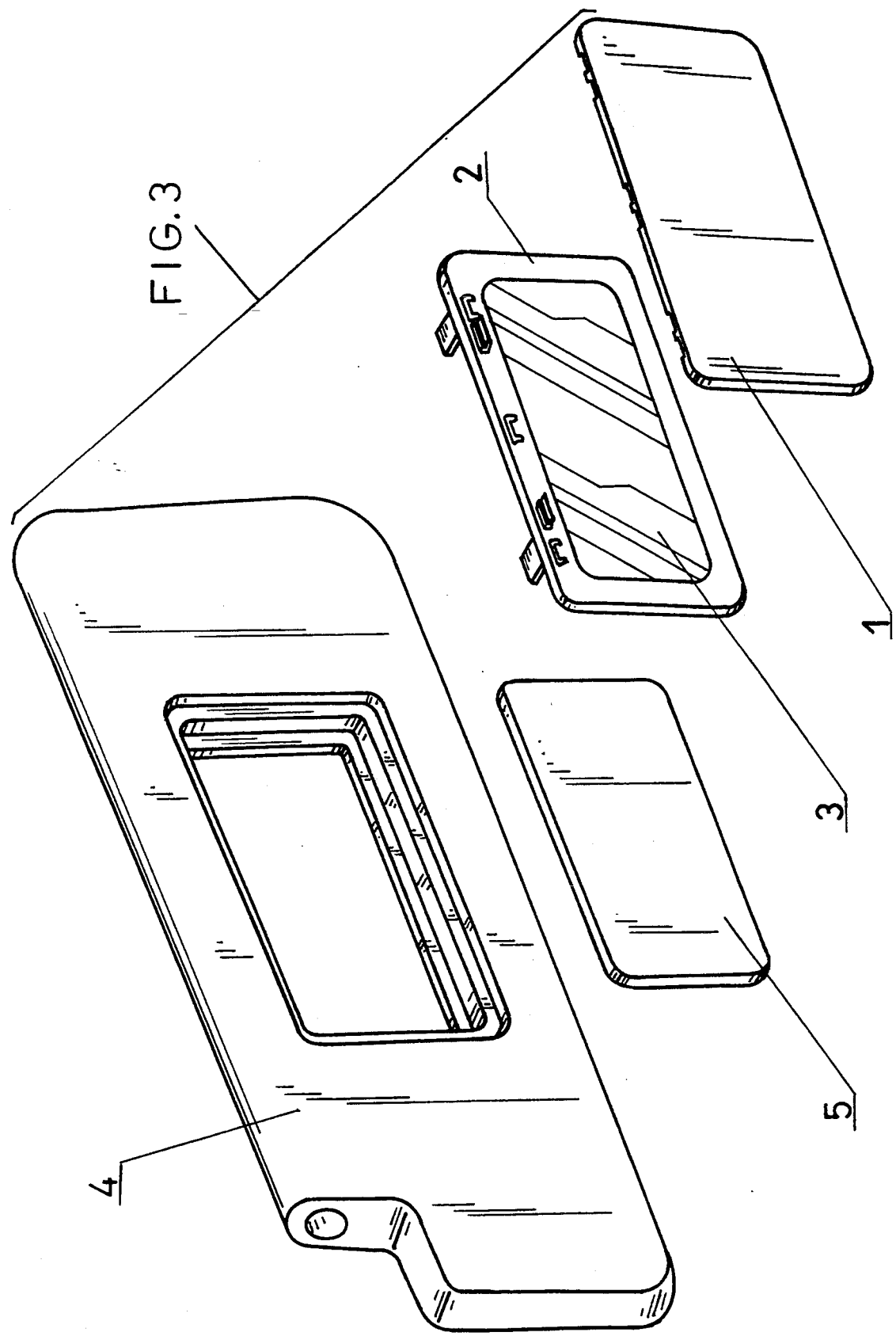
FIG. 3 is an exploded perspective view showing the sun visor body with its mirror installation group before mounting.

FIG. 3 shows, in an exploded perspective view, the sun visor body and the mirror installation group including the hinged cover 1, the frame 2, and the make-up mirror 3. The mirror installation group may also include a plate 5 which rests against the rear side of the make-up mirror 3.

The sun visor body 4 has a rectangular passage opening with stepped grooves formed into its first wide surface. The steps provide support for the installed elements. The mirror installation group is inserted from that first wide side of the sun visor body 4 into the opening. FIG. 3 shows that connecting elements which extend rearward perpendicular to the plane of the frame 2 are seated on the frame.

FIG. 4 is also an exploded perspective view of the sun visor body 4 with the storage compartment installation group. The locking mechanism 7 cooperates with a locking pin on the storage compartment. The storage compartment has a bottom and walls perpendicular to and upstanding over the bottom thereof. The compartment is detachably included on the frame 8. Hinge lugs for enabling pivoting of the storage compartment 6 by the illustrated hinge pins are arranged on the lower longitudinal edge of the frame 8.

The mirror installation unit is installed by simply inserting it from the first side of the sun visor body 4 into its passage opening, while the storage compartment unit is inserted from the other second side of the visor body into the opposite side of the same aligned opening. The opening in the sun visor body extends through it. The pivot mounting of the hinged cover 1 to the frame 2 can be effected in the manner described in German Patent Application P 39 36 350.3.

The individual parts of the sun visor can be developed predominantly as plastic injected moldings. The sun visor body 4 can be of foam rubber or other conventional visor body material, possibly stiffened by an insert.

It is obvious that the invention can also be used in the case of a sun visor which has an illuminating device which makes it possible to use the mirror even in the dark.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A sun visor for a vehicle, comprising
    a sun visor body having first and second opposite wide sides with respective first and second surfaces;
    the first side having a first recess defined therein, and countersunk into the first surface, for receiving a mirror; a mirror supported in the first recess;
    the second side having a second recess defined therein, and countersunk into the second surface, for receiving a storage compartment for articles; a frame around, and defining and being seated in the second recess;
    a storage compartment in the second recess, the storage compartment including a bottom and walls upstanding from the bottom, the storage compartment having an edge mounted for swinging the storage compartment on the frame.

2. The sun visor of claim 1, wherein the sun visor first side with the mirror thereon is the side thereof accessible to the user of the sun visor in the position of use thereof in front of the windshield.

3. The sun visor of claim 2, wherein the sun visor second side is the side thereof that is accessible to the user with the sun visor body in the position of non-use generally at the ceiling of the vehicle.

4. The sun visor of claim 1, wherein the sun visor second side is the side thereof that is accessible to the user with the sun visor body in the position of non-use generally at the ceiling of the vehicle.

5. The sun visor of claim 3, wherein the first and second recesses are defined by an opening which passes through the sun visor body between the recesses.

6. The sun visor of claim 1, wherein the first and second recesses are defined by an opening which passes through the sun visor body between the recesses.

7. The sun visor of claim 6, further comprising a mirror frame installed in the first recess from the first side and shaped for holding the mirror; and a storage frame installed in the second recess from the second side and shaped for mounting the storage compartment.

8. The sun visor of claim 7, wherein the frames are fastened to each other by connecting elements.

9. The sun visor of claim 1, further comprising a mirror frame installed in the first recess from the first side shaped for holding the mirror; and a storage frame installed in the second recess from the second side and shaped for mounting the storage compartment.

10. The sun visor of claim 9, further comprising a locking mechanism on the storage compartment for locking the storage compartment to the storage frame and holding it in a closed position, means on the locking mechanism for unlocking it for releasing the storage compartment.

11. The sun visor of claim 1, further comprising a locking mechanism on the storage compartment for locking the storage compartment to the frame and holding it in a closed position, means on the locking mechanism for unlocking it for releasing the storage compartment.

12. The sun visor of claim 9, further comprising a hinged cover over the mirror movable between a position covering the mirror and uncovering the mirror, the cover being supported on the mirror frame.

13. The sun visor of claim 1, further comprising a hinged cover over the mirror movable between a position covering the mirror and uncovering the mirror.

* * * * *